(12) United States Patent
Chou et al.

(10) Patent No.: US 10,617,943 B2
(45) Date of Patent: Apr. 14, 2020

(54) CONTROLLER WITH A MOTOR MODULE

(71) Applicant: Cheng Uei Precision Industry Co., Ltd., New Taipei (TW)

(72) Inventors: Hsieh Cheng Chou, New Taipei (TW); Chi Ming Tseng, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 16/153,644

(22) Filed: Oct. 5, 2018

(65) Prior Publication Data
US 2019/0366206 A1 Dec. 5, 2019

(30) Foreign Application Priority Data
Jun. 1, 2018 (TW) .............................. 107207375 U

(51) Int. Cl.
| | | |
|---|---|---|
| *A63F 13/00* | (2014.01) | |
| *A63F 13/28* | (2014.01) | |
| *A63F 13/24* | (2014.01) | |
| *H02K 5/24* | (2006.01) | |
| *H02K 7/06* | (2006.01) | |

(52) U.S. Cl.
CPC .............. *A63F 13/28* (2014.09); *A63F 13/24* (2014.09); *H02K 5/24* (2013.01); *H02K 7/063* (2013.01)

(58) Field of Classification Search
None
See application file for complete search history.

(56) References Cited

U.S. PATENT DOCUMENTS

| | | | | |
|---|---|---|---|---|
| 6,171,191 B1 * | 1/2001 | Ogata | ..................... | A63F 13/06 463/38 |
| 6,585,595 B1 * | 7/2003 | Soma | ...................... | A63F 13/06 463/36 |
| 6,680,729 B1 * | 1/2004 | Shahoian | ................ | A63F 13/06 345/156 |
| 7,825,555 B2 * | 11/2010 | Uchiumi | .................. | H02K 5/00 310/81 |
| 7,888,832 B2 * | 2/2011 | Masato | ..................... | B06B 1/16 310/81 |
| 8,421,289 B2 * | 4/2013 | Hara | ........................ | H02K 5/04 310/81 |
| 2003/0216180 A1 * | 11/2003 | Shinohara | ............... | A63F 13/06 463/37 |
| 2004/0048664 A1 * | 3/2004 | Shinohara | ............... | A63F 13/06 463/37 |
| 2005/0073205 A1 * | 4/2005 | Takagi | ..................... | H02K 5/00 310/89 |

(Continued)

*Primary Examiner* — Jay Trent Liddle
*Assistant Examiner* — Alex F. R. P. Rada, II
(74) *Attorney, Agent, or Firm* — Lin & Associates Intellectual Property, Inc.

(57) ABSTRACT

The present invention is a controller with a motor module. The controller with a motor module comprises a body. A support is disposed inside the body. The support comprises an alignment part and an engaging part both are disposed on the support. A motor module has a central axis and is capable of dismounting from the support. The motor module comprises a housing, a matching part and a blocking part both are disposed on the housing. When the motor module is applied a force to make the motor module rotates along the central axis thereof, the matching part engages with the alignment part, and the blocking part engages with the engaging part.

16 Claims, 19 Drawing Sheets

(56) References Cited

U.S. PATENT DOCUMENTS

| | | | |
|---|---|---|---|
| 2005/0206257 A1* | 9/2005 | Takagi | H02K 5/00 310/81 |
| 2005/0242672 A1* | 11/2005 | Huang | H02K 7/061 310/81 |
| 2006/0138885 A1* | 6/2006 | Uchiumi | H02K 5/00 310/81 |
| 2007/0163394 A1* | 7/2007 | Zhang | H02K 5/00 81/9.51 |
| 2007/0241626 A1* | 10/2007 | Suzuki | H02K 5/00 310/71 |
| 2007/0253178 A1* | 11/2007 | Uchiumi | H02K 5/00 361/807 |
| 2008/0278013 A1* | 11/2008 | Umehara | H02K 5/26 310/81 |
| 2009/0039721 A1* | 2/2009 | Takagi | H02K 5/225 310/81 |
| 2009/0051238 A1* | 2/2009 | Umehara | H02K 5/00 310/91 |
| 2011/0109181 A1* | 5/2011 | Ohshima | B06B 1/16 310/81 |
| 2011/0291510 A1* | 12/2011 | Hara | H02K 5/04 310/91 |
| 2014/0073431 A1* | 3/2014 | Goto | G05G 9/047 463/37 |
| 2014/0265677 A1* | 9/2014 | Orand | H02K 5/08 310/81 |

\* cited by examiner

CONTROLLER WITH A MOTOR MODULE

CROSS-REFERENCE TO RELATED APPLICATION

The present application is based on, and claims priority form, Taiwan Patent Application No. 107207375, filed Jun. 1, 2018, the disclosure of which is hereby incorporated by reference herein in its entirety.

BACKGROUND OF THE INVENTION

1. Field of the Invention

The present invention generally relates to a controller, more particularly, the controller comprises a detachable motor module, wherein the motor module is able to replace a different vibration amplitude of a vibration motor and a different weight of a weight member.

2. The Related Art

At present, most of game controllers are designed to operate with both hands. Some of conventional hand-held game controllers include different function switches to provide a user for playing game, such like action buttons, directional gamepads, thumbsticks, multifunction triggers, bumper buttons and/or paddles. Specifically, the action buttons, directional gamepads and thumbsticks are disposed in a top of game controller. The multifunction triggers and the bumper buttons are disposed in a front of game controller. And the paddles are disposed in a bottom of game controller. At the same time, in order to provide immediate feedback to the user regarding their actions and choices, most of the game controller are usually equipped with a vibration motor to provide vibration feedback With the rise of the electronic sport, it also promotes rapidly the gaming market. The demand for game feel of game controller for the users is more and more diversified. Some users prefer the heavier ones, others prefer the lighter ones. Each user has the different preference for a vibration amplitude of the game controller. However, the game controller usually doesn't have the enough space to accommodate a weight member because the vibration motor has mounted therein. Therefore, the game controller with a function which can change the vibration amplitude of the vibration motor and replace a different weight of weight member is less.

SUMMARY OF THE INVENTION

The present invention is to provide a controller with a motor module, the motor module comprises a vibration motor and at least one weight member. A user is able to replace a different vibration amplitude of the vibration motor and a different weight of the weight member.

An object of the present invention provides a controller with a motor module. The controller with a motor module comprises a body. A support is disposed inside the body. The support comprises an alignment part and an engaging part both are disposed on the support. A motor module has a central axis and is capable of dismounting from the support. The motor module comprises a housing, a matching part and a blocking part both are disposed on the housing. When the motor module is applied a force to make the motor module rotates along the central axis thereof, the matching part engages with the alignment part, and the blocking part engages with the engaging part.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
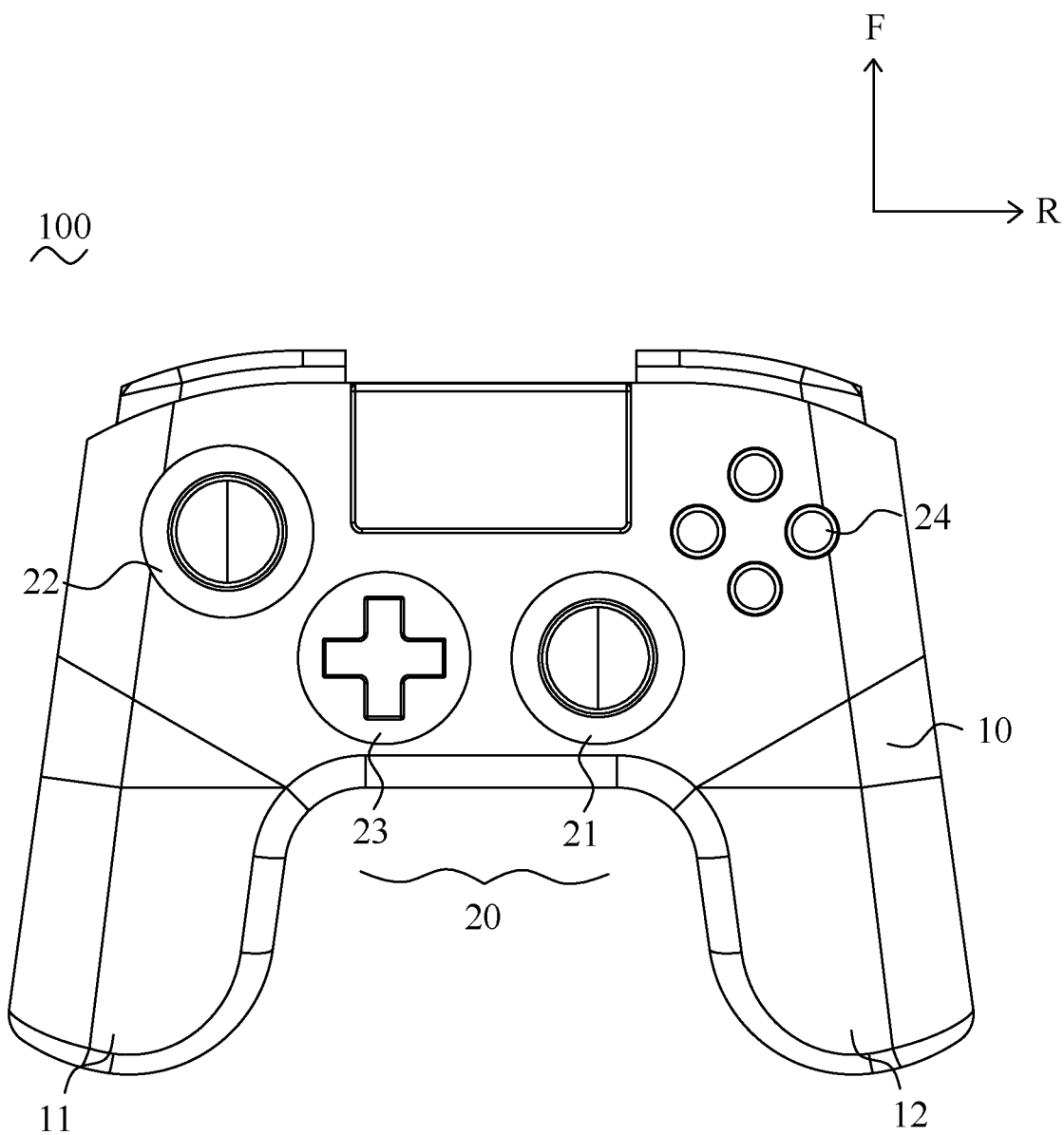
FIG. 1 is a schematic view of a top of a game controller with a motor module.
Figure 2:
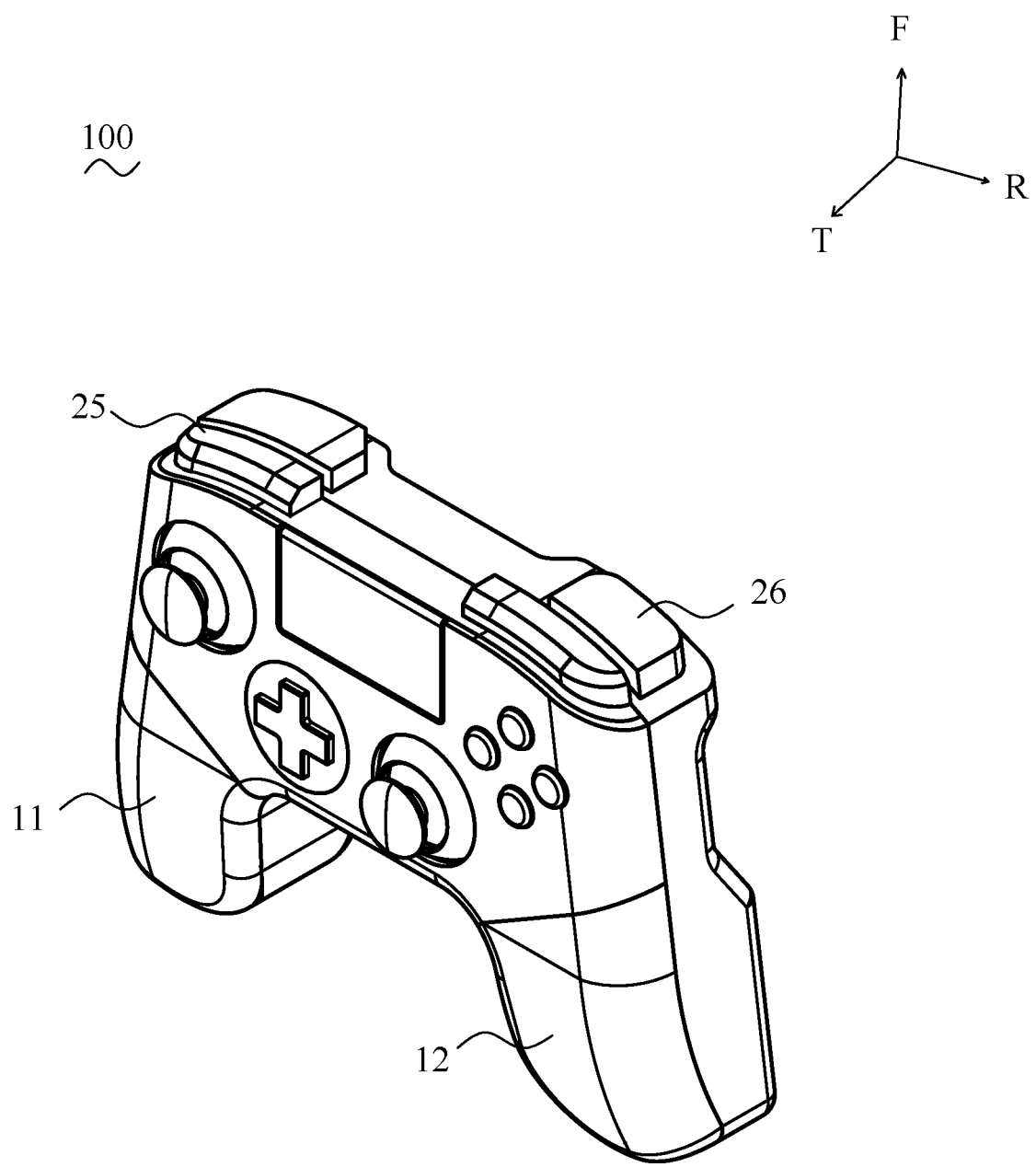
FIG. 2 is another view of the game controller with the motor module of FIG. 1.
Figure 3:
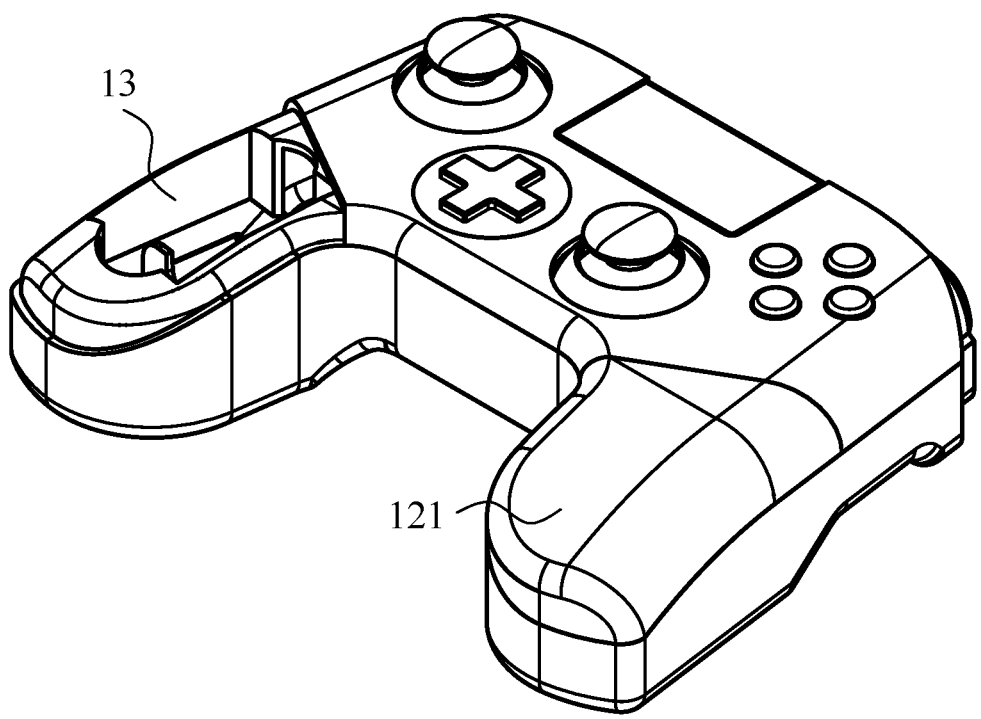
FIG. 3 is an exploded view of the game controller with the motor module.
Figure 4:
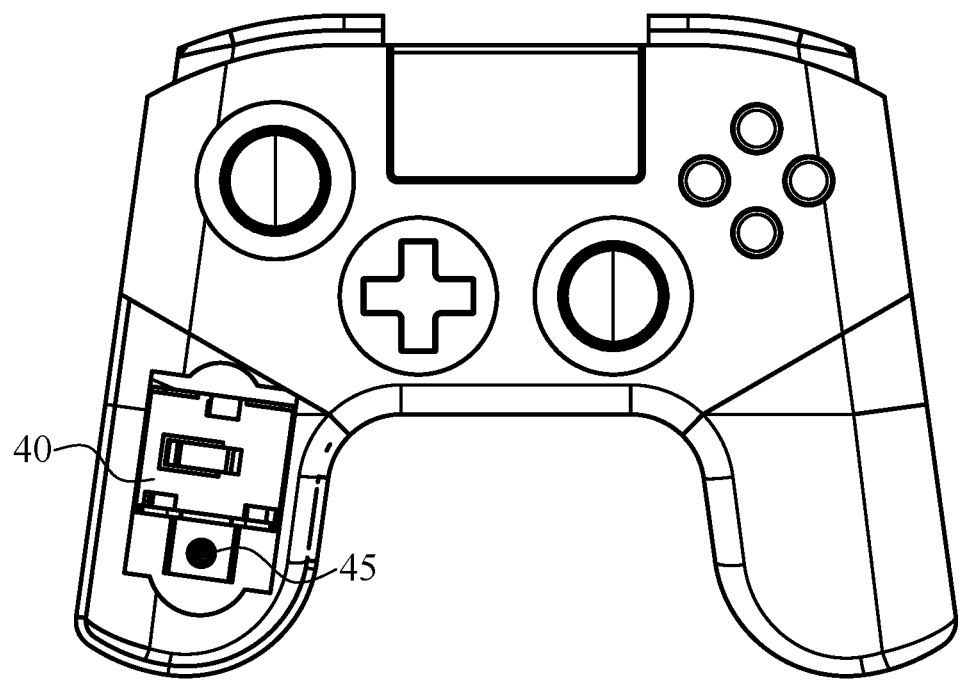
FIG. 4 is a schematic view of the top of the game controller with the motor module, wherein a support is mounted in the game controller but the motor module is not shown.

The following detailed description is merely exemplary in nature and is not intended to limit the applications and uses disclosed herein. Further, there is no intention to be bound by any theory presented in the preceding background or summary or the following detailed description.

A controller with a motor module of the present invention can be one of a game controller, a handheld device controller, a manipulator controller, and etc. However, an embodiment of the present invention adopts the game controller for following description, it is not intended to limit in the game controller.

Referring to FIG. 1 to FIG. 4, a game controller 100 is shown. The game controller 100 includes a body 10, a plurality of controlling modules 20, a motor module 30 and a support 40.

In the following description, as reference to FIG. 1 to FIG. 15, the description is given with a F direction being defined as a forward direction, and a direction opposite to the forward direction being defined as a backward direction. The description is given with a T direction being defined as a top direction, and a direction opposite to the top direction being defined as a bottom direction. The description is given with a R direction being defined as a right direction, and a direction opposite to the right direction being defined as a left direction.

The body 10 has a left-side handle 11 and a right-side handle 12 for providing a user to grasp thereon, wherein both a surface of the left-side handle 11 and a surface of the right-side handle 12 set a detachable left-side cover 111 and a detachable right-side cover 121 respectively. Moreover, each of the left-side handle 11 and the right-side handle 12 has an accommodating hole 13 therein respectively, wherein each accommodating hole 13 is configured to accommodate the motor module 30, and a bottom of each accommodating hole 13 has the support 40 being fixed thereon.

The controlling modules 20 comprises a right thumbstick 21, a left thumbstick 22, a directional gamepad 23, four action buttons 24, two bumper buttons 25 and two triggers 26. The right thumbstick 21, the left thumbstick 22, the directional gamepad 23, and the action buttons 24 are located on a top of the game controller 100 which are intended to be operated by the user's left and right thumbs respectively. The bumper buttons 25 and the triggers 26 are located on a front of the game controller 100 which are intended to be operated by the user's index fingers.

Referring to FIG. 5A to FIG. 7, the motor module 30 in accordance with a first embodiment of the present invention is shown. In the first embodiment, the motor module 30 comprises a housing 31, a vibration motor 32 and a weight member 33, wherein the housing 31 is a cylindrical shape with a central axis X, the housing 31 has an elastic recovery material such as metal or plastic.

Two ends of the housing 31 form a first opening 311 and a second opening 312 respectively. Each of the first opening 311 and the second opening 312 has a bearing part respectively. The bearing part located in a bottom of the first opening 311 being defined as a first-opening bottom surface 3111, the bearing part located in a bottom of the second opening 311 being defined as a second-opening bottom surface 3121. The first-opening bottom surface 3111 is configured to be a bearing surface for the vibration motor 32 and the second-opening bottom surface 3121 is configured to be a bearing surface for the weight member 33.

The first opening 311 is configured to accommodate the vibration motor 32. The vibration motor 32 includes a stator core 321 and a connecting port 322, wherein the stator core 321 is fixed to a front end of an output shaft 3211 of the vibration motor 32, the rotary force of the output shaft 3211 drives the stator core 321 to work and then makes the motor module 30 to vibrate. Specifically, the stator core 321 is exposed outside the first opening 311. The connecting port 322 of the vibration motor 32 electrically connects with a connect port of the game controller 100. Moreover, because the vibration motor 32 make noise when the vibration motor 32 operates in the housing 31, a sound-absorbing member 34 is set around the vibration motor 32 to reduce the noise, wherein the sound-absorbing member 34 is a sponge.

The second opening 312 is configured to accommodate the weight member 33. A holding part 313 is arranged around the second opening 312 of the housing 31, wherein the holding part 313 is a hook structure, the user can apply force to the holding part 313 and makes the holding part 313 to loose to replace the weight member 33.

A surface of the housing 31 comprises a plurality of matching portions 314, a first matching portion 3141 is arranged near the second opening 312 of the housing 31, a second matching portion 3142 and a third matching portion 3143 are arranged near the first opening 311 of the housing 31. Each of the matching portions 314 extends from the surface of the housing 31 and bends toward same direction to form a L shape hook structure, each of the matching portions 314 and the surface of the housing 31 form an access slot therebetween, wherein a direction of an opening of all the access slot faces along the clockwise direction or the counter-clockwise direction of the central axis X. The surface of the housing 31 further includes a blocking part 315, a driving part 316 and a notch 317. Specifically, the blocking part 315 is a wedge which raises on the surface of the housing 31. The driving part 316 is a rib which raises on the surface of the housing 31 along an axial direction of the central axis X, the rib is provided for the user a position of applying force to rotate the motor module 30. The notch 317 is located near the first opening 311 of the surface of the housing 31 and corresponded to the connecting port 322 of the vibration motor 32, which is configured as a linked window between the game controller 100 and the vibration motor 32.

When the motor module 30 is rotated by the user, the first matching portion 3141, the second matching portion 3142, the third matching portion 3143, and the blocking part 315 are engaged with the support 40. Therefore, when the motor module 30 is arranged in the accommodating hole 13, the driving part 316 is exposed from the accommodating hole 13 of the game controller 100, but the first matching portion 3141, the second opening 312, the third matching portion 3143, the blocking part 315 and the support 40 is hidden in the accommodating hole 13 of the game controller 100.

Figure 6:
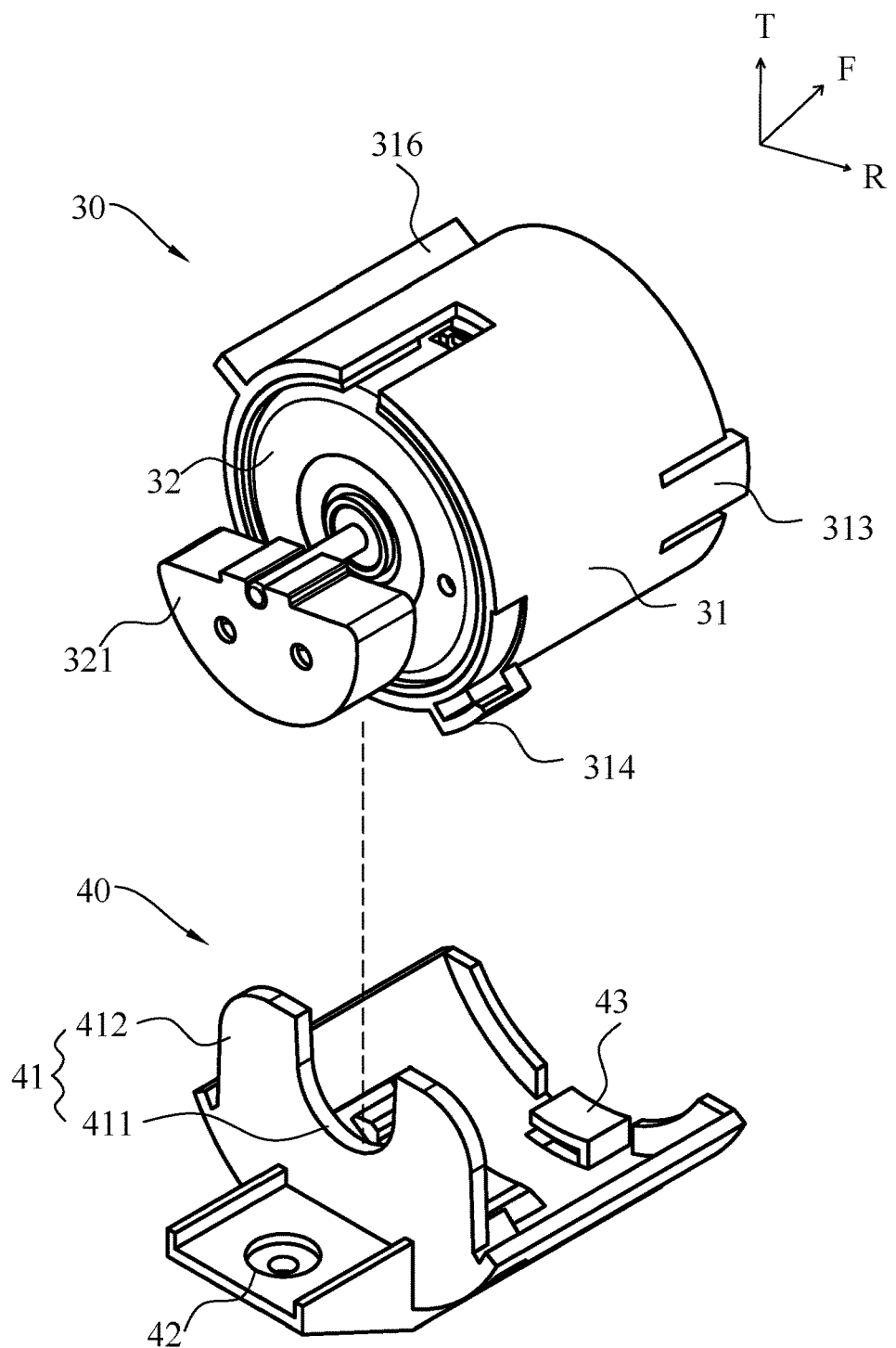
FIG. 6 is an exploded view of the motor module and the support according to the first embodiment.
Figure 7:
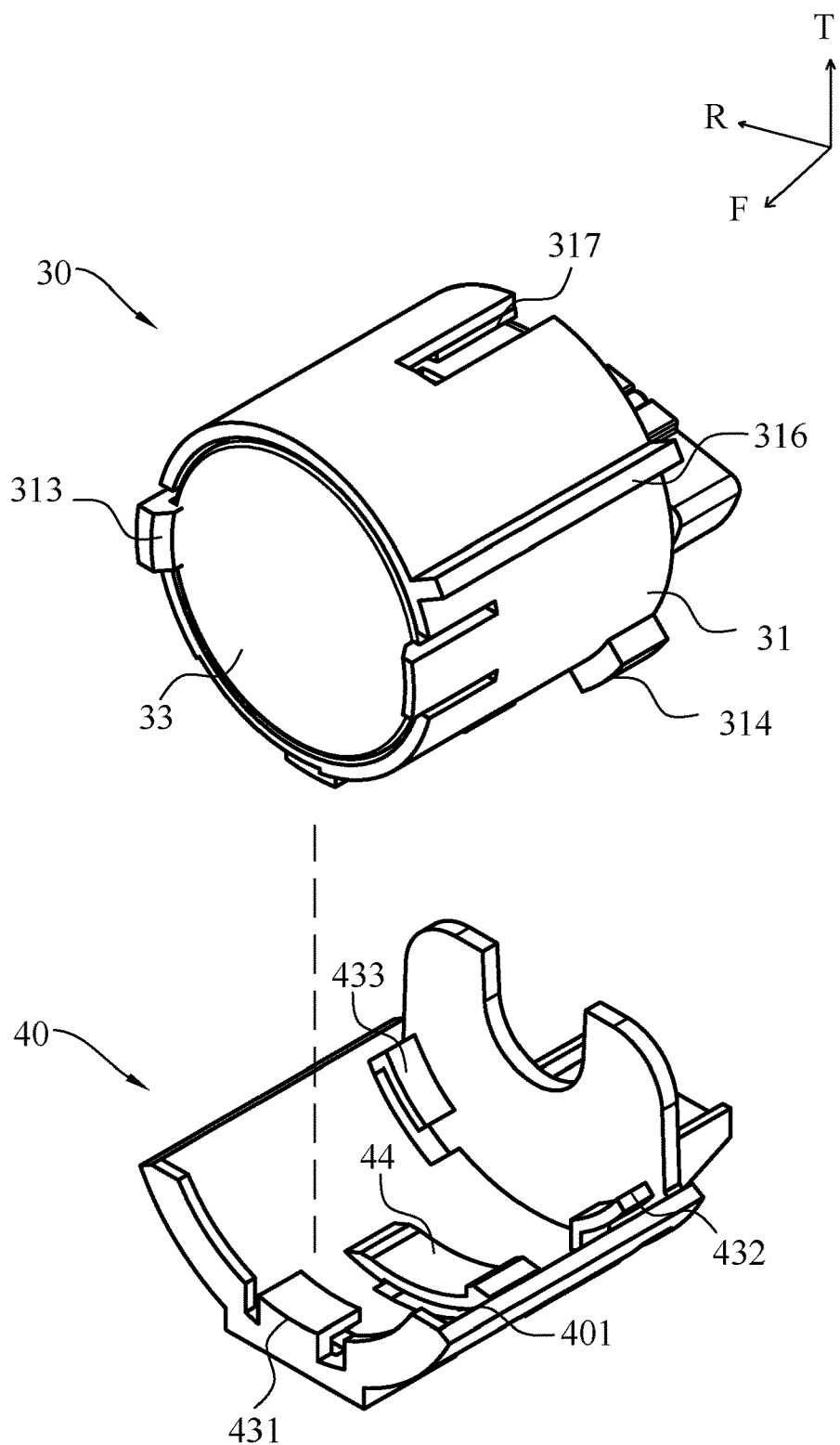
FIG. 7 is another exploded view of the motor module and the support of FIG. 6.

Referring to FIG. 6 and FIG. 7, an exploded view of the motor module 30 and the support 40 according to the first embodiment. The support 40 is used to hold the motor module 30, wherein the support 40 has a surface which corresponds to the cylindrical shape of the housing 31. A back end of the support 40 extends upward to form a baffle plate 41 which is configured to block the vibration motor 32 to prevent the vibration motor 32 from being disengaged from the first opening 311 when the vibration motor 32 vibrates. Specifically, a notch area 411 in a middle of the baffle plate 41 is provided for receiving the output shaft 3211 of the vibration motor 32 and passing therethrough. Moreover, the baffle plate 41 comprises two blocking portion 412 for blocking the vibration motor 32, two blocking portion 412 are located at two sides of the notch area 411 respectively.

Furthermore, the baffle plate 41 protrudes backward to form a fixing part 42 which is able to collaborate with a fixing member 45, wherein the fixing part 42 is fixed by the fixing member 45 (referring to FIG. 4) in the accommodating hole 13 of the game controller 100. In the embodiment of the present invention, the fixing part 42 has a plate extending from the baffle plate 41, and a screw hole formed on the plate. The fixing member 45 is a screw. In some embodiment, the support 40 is formed integrally inside the game controller 100.

In addition, the support 40 includes a plurality of alignment part 43 and an engaging part 44 disposed on the surface thereof. The plurality of alignment part 43 are configured to engage with the matching part 314 of the housing 31, each the alignment part 43 extends from the surface of the support 40 and bends to form a L shape, and an access hole forms between each the alignment part 43 and the surface of the support 40, wherein a first alignment part 431 is located in a front end of the support 40, a second alignment part 432 and a third alignment part 433 are located in both sides of the back end of the support 40 and close to the baffle plate 41.

The engaging part 44 has a cantilever extending from the surface of the support 40, and a protrusion located at a free end of the cantilever to engage with the blocking part 315. The engaging part 44 is an elastic fastener being formed on the support 40, wherein a hollow area 401 is formed in the support 40 and below the engaging part 44.

Figure 8A:
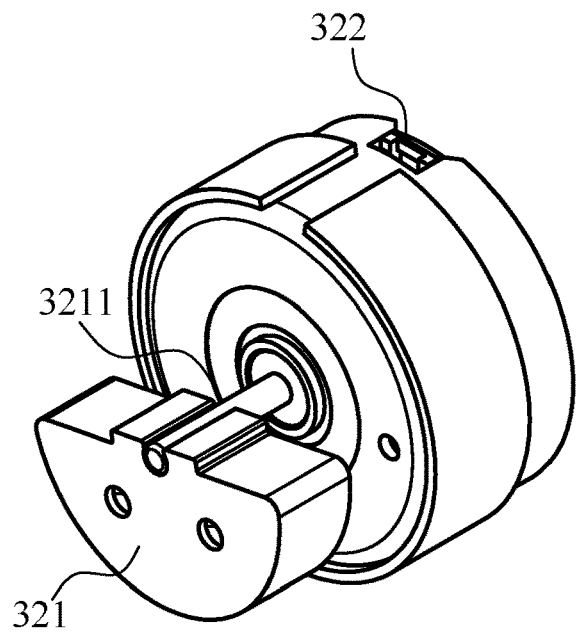
FIG. 8A is a schematic view of a vibration motor according to the first embodiment.
Figure 8B:
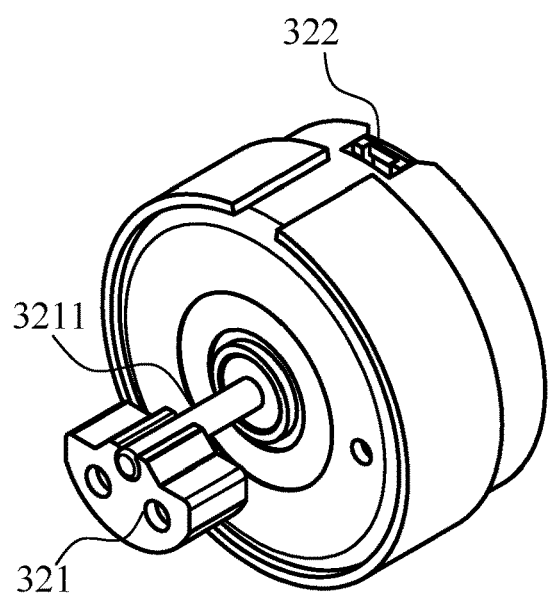
FIG. 8B is a schematic view of another vibration motor according to the first embodiment.

Referring to FIG. 8A and FIG. 8B, a schematic view of the different stator cores 321 engaged with the vibration motor 32 according to the first embodiment. Because the vibration motor 32 provides the rotary force to the output shaft 3211 and then drives the stator core 321, the motor module 30 produces the vibration accordingly. Therefore, the different effect of the vibration can be changed by the variety of the shape or the weight of the stator core 321. In the embodiment of the present invention, the user can replace the vibration motor 32 with different shape of the stator core 321 according to the user's preference.

Figure 5A:
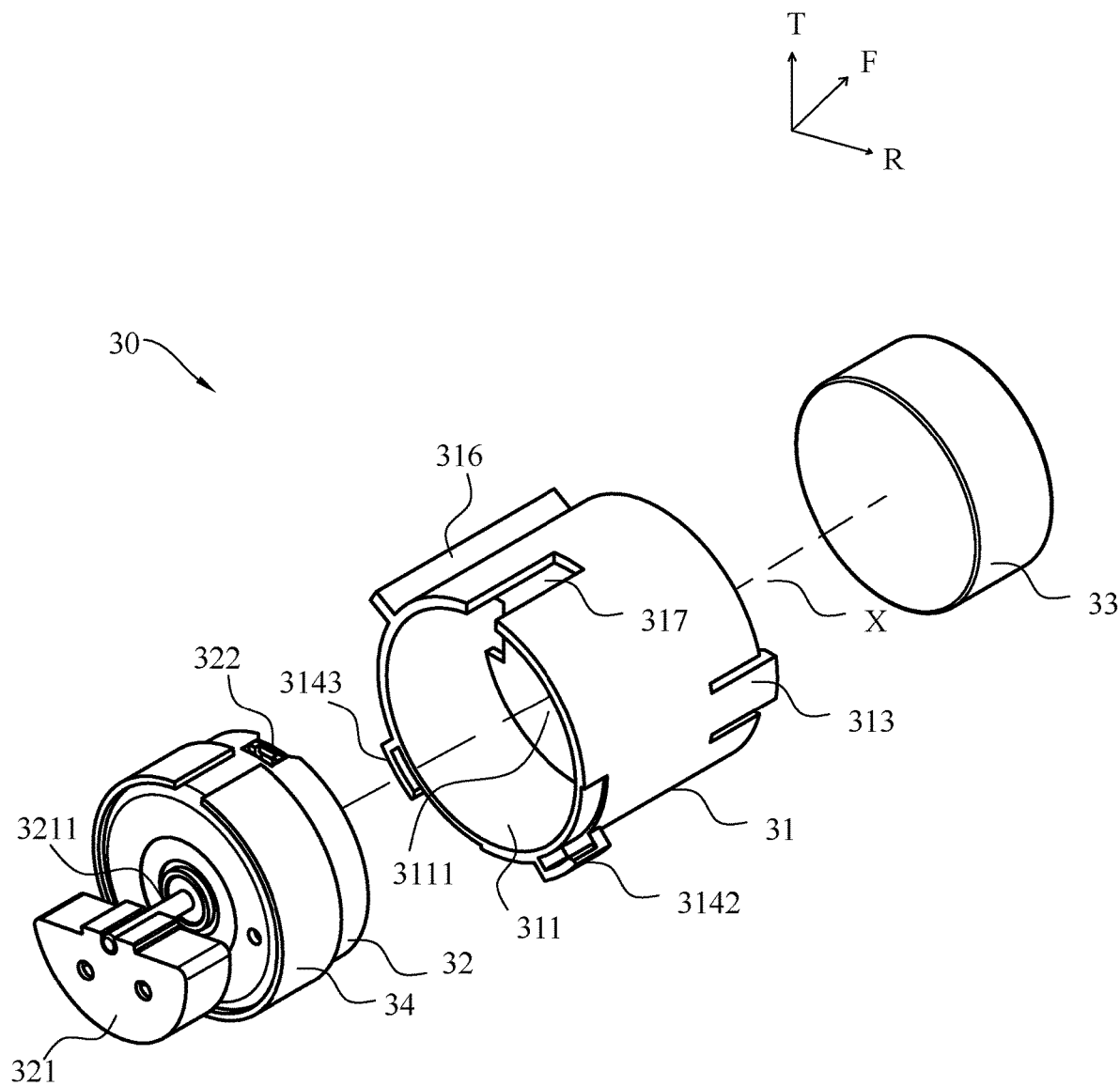
FIG. 5A is an exploded view of the motor module of the game controller according to a first embodiment.
Figure 5B:
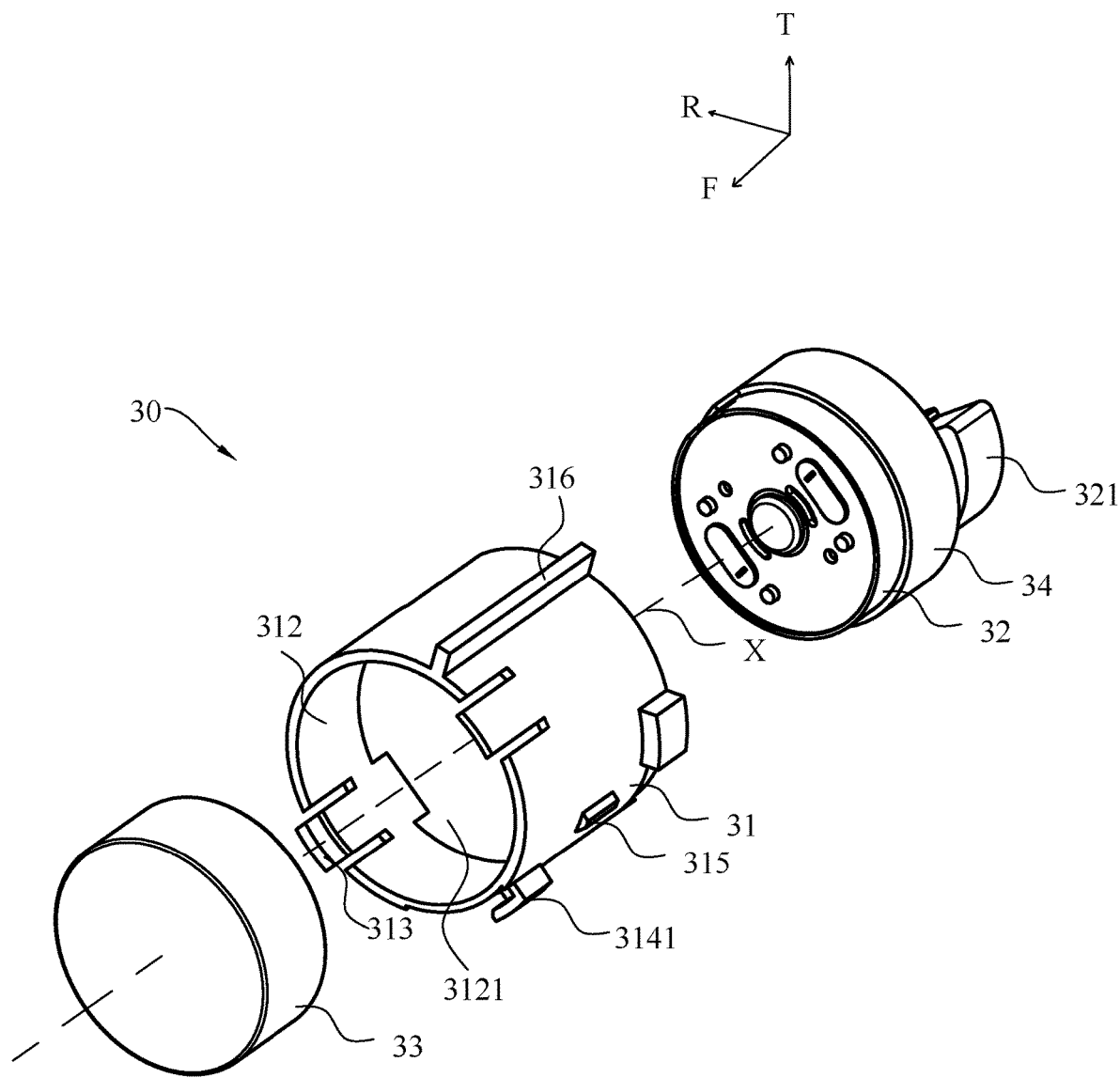
FIG. 5B is another exploded view of the motor module of the game controller of FIG. 5A.
Figure 9A:
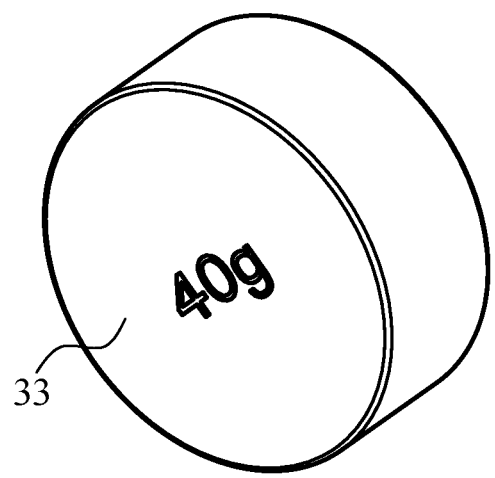
FIG. 9A is a schematic view of a weight member according to the first embodiment.
Figure 9B:
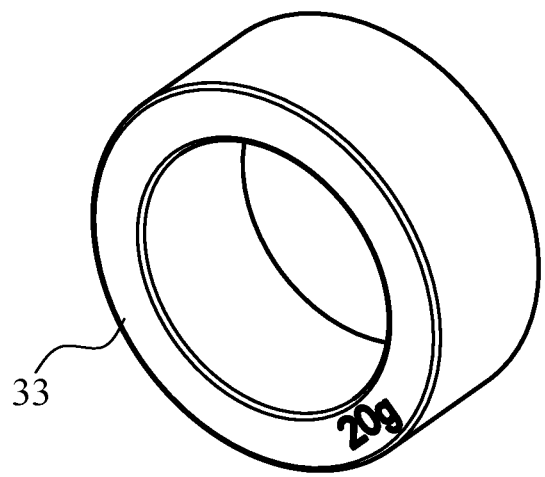
FIG. 9B is a schematic view of another weight member according to the first embodiment.
Figure 10A:
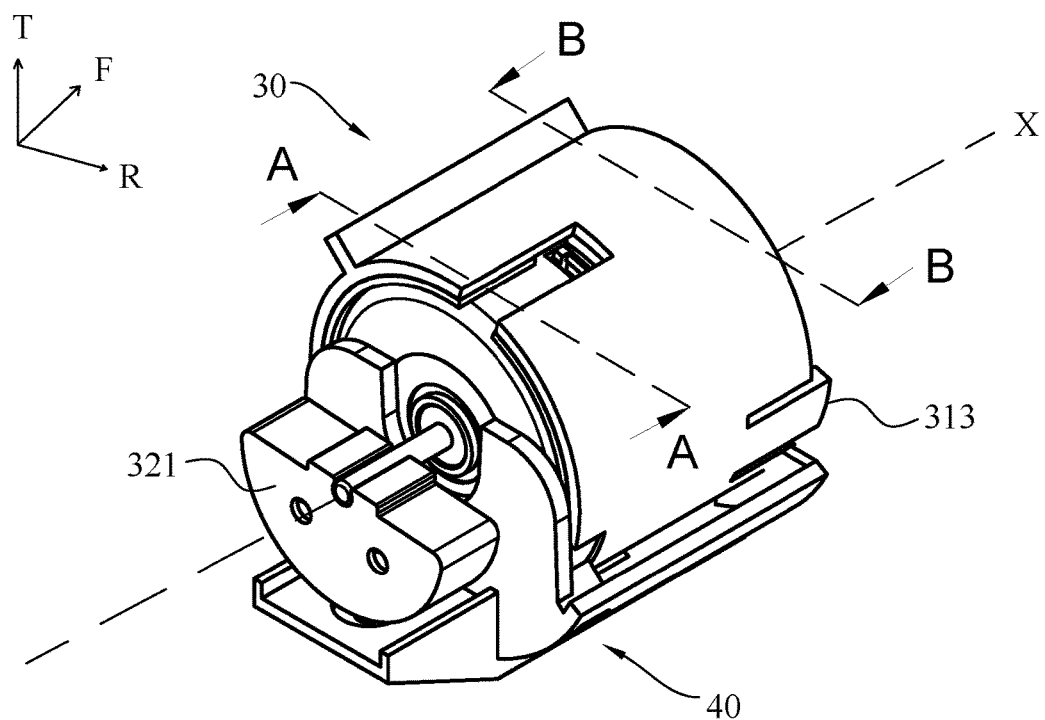
FIG. 10A is a schematic view of the motor module and the support according to the first embodiment, wherein the motor module is not fixed to the support.
Figure 10B:
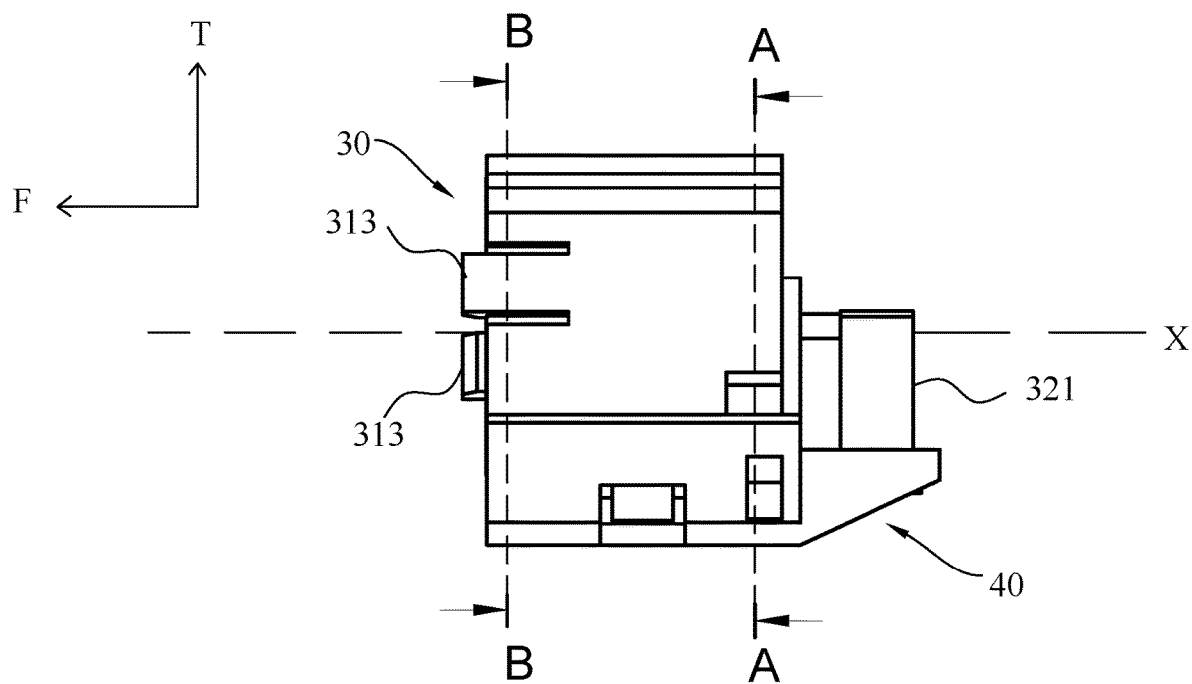
FIG. 10B is side view of the motor module and the support of FIG. 10A, wherein the motor module is not fixed to the support.
Figure 11A:
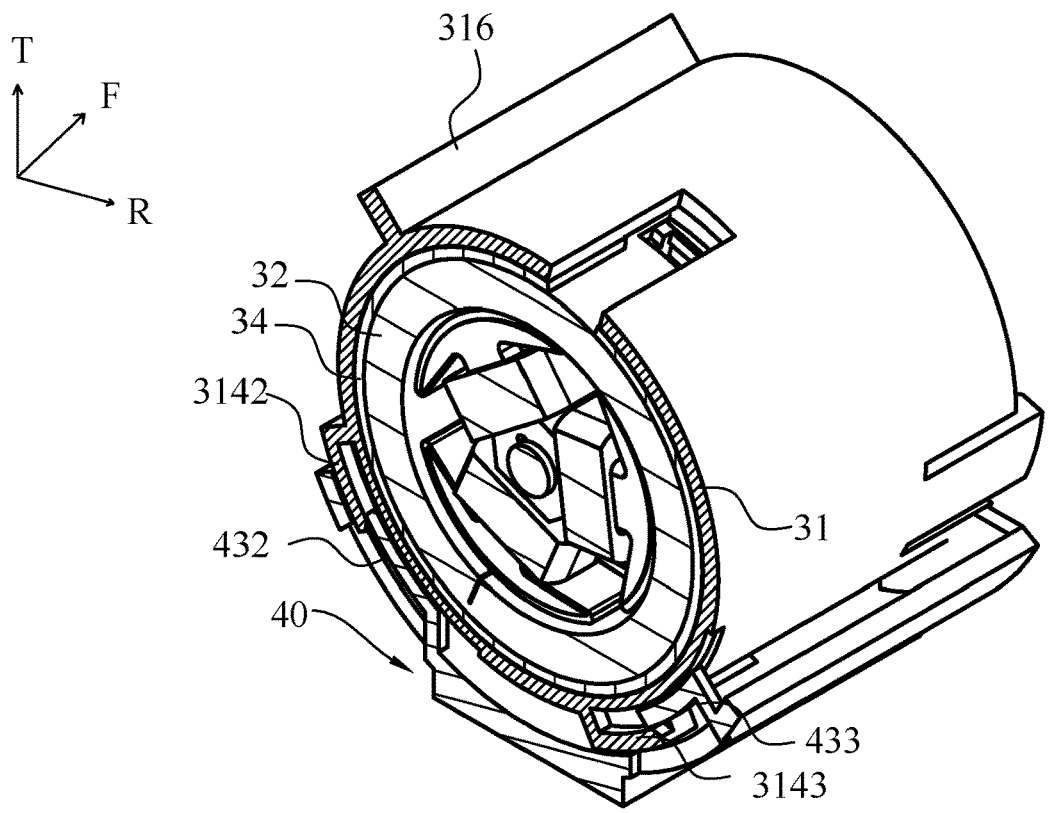
FIG. 11A is a cross-sectional view of FIG. 10A along line A-A.
Figure 11B:
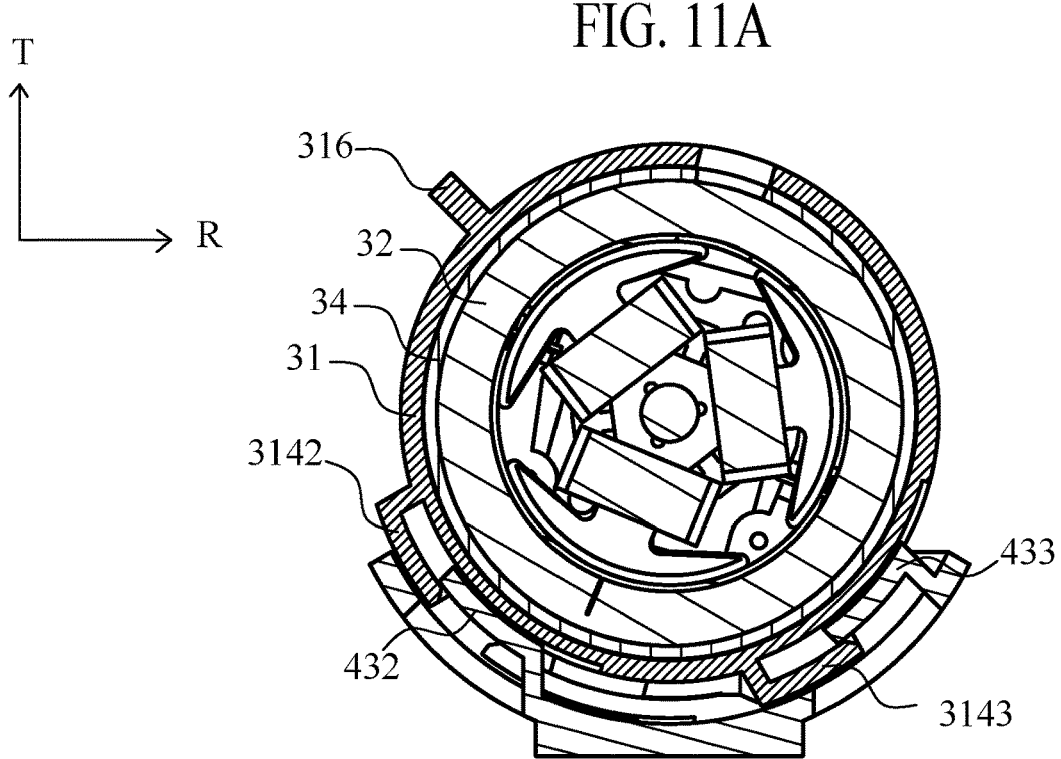
FIG. 11B is a cross-sectional view of FIG. 10B along line A-A.
Figure 12A:
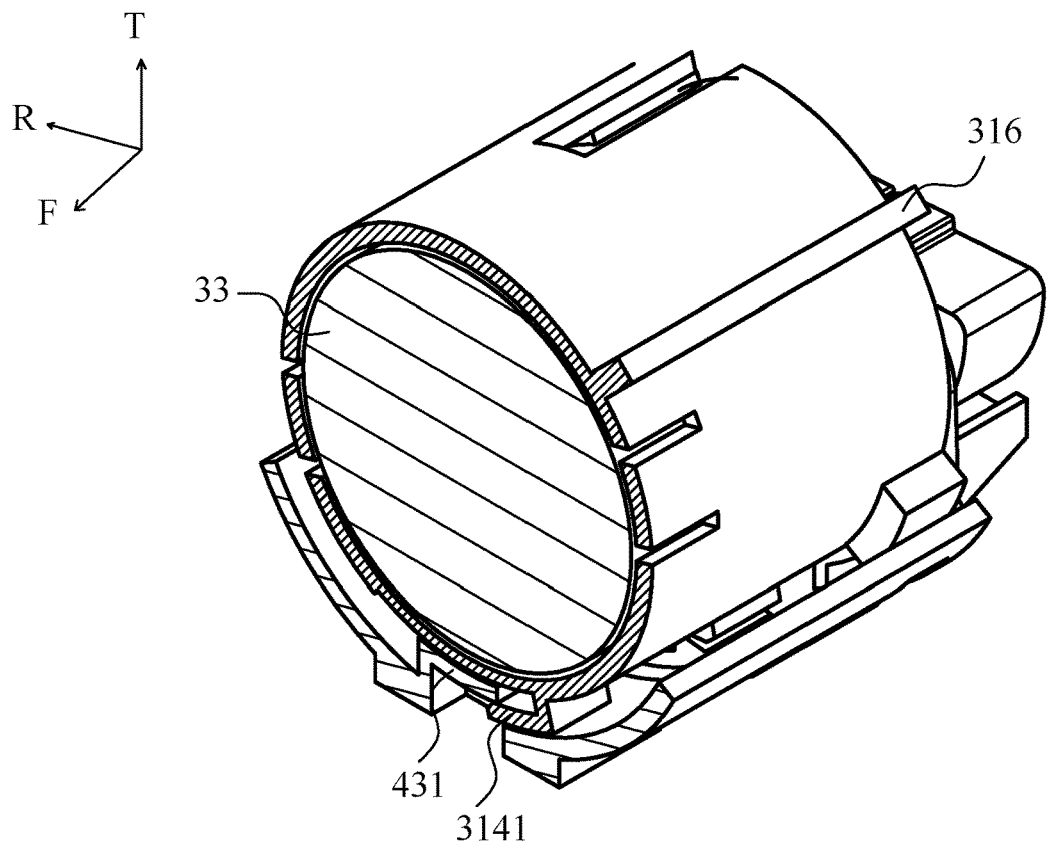
FIG. 12A is a cross-sectional view of FIG. 10A along line B-B.
Figure 12B:
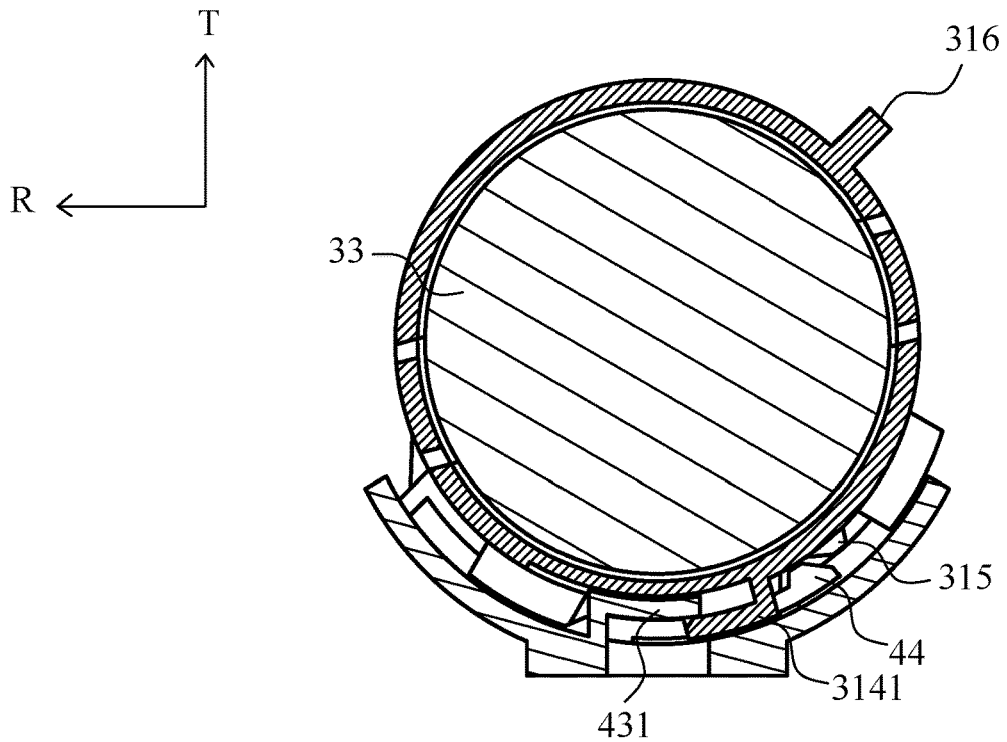
FIG. 12B is a cross-sectional view of FIG. 10B along line B-B.
Figure 13A:
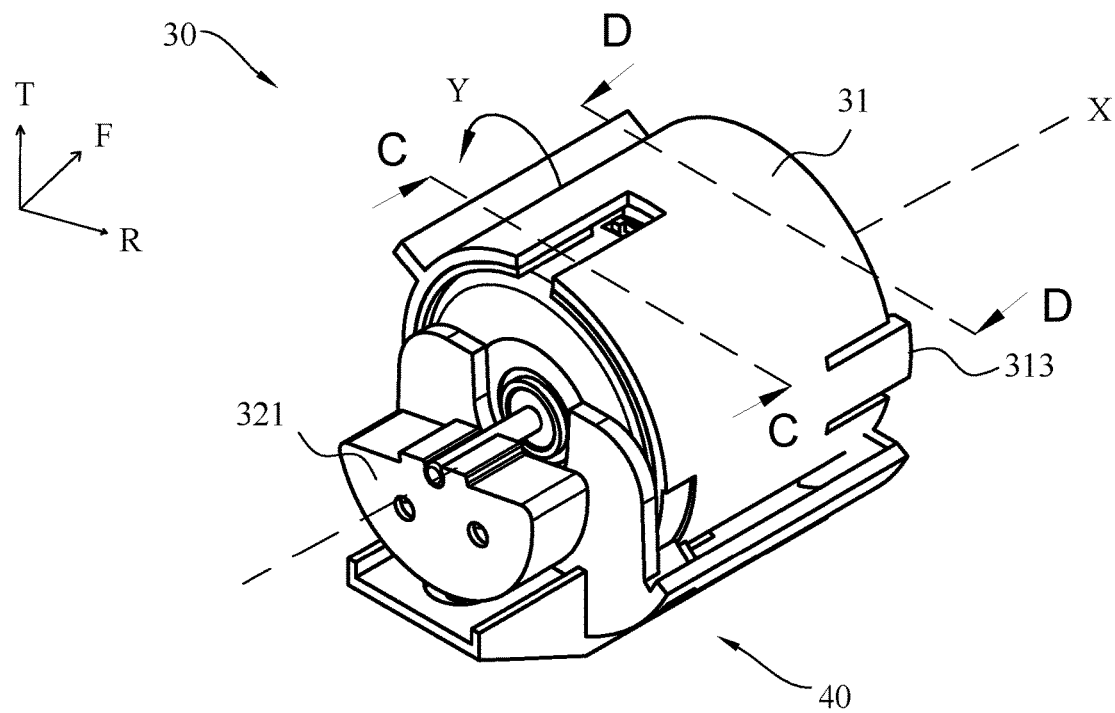
FIG. 13A is a schematic view of the motor module and the support according to the first embodiment, wherein the motor module is fixed to the support.
Figure 13B:
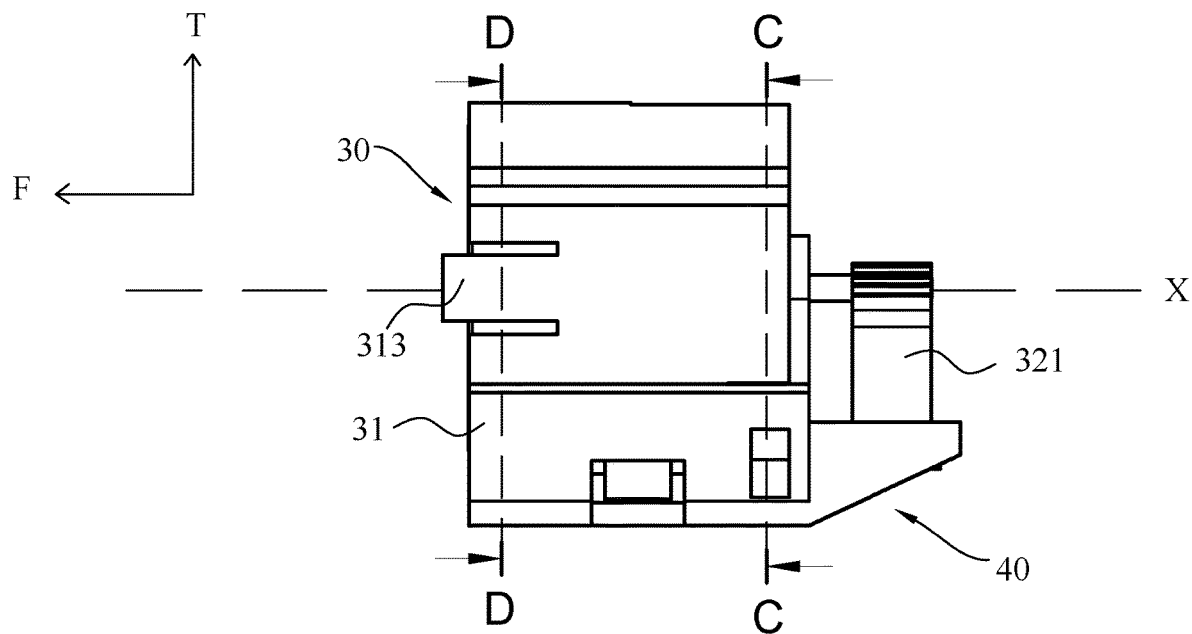
FIG. 13 B is a side view of the motor module and the support according to the first embodiment, wherein the motor module is fixed to the support.

Referring to FIG. 5B, FIG. 9A and FIG. 9B, a schematic view of the different weight member 33 according to the first embodiment is shown; The weight member 33 is arranged inside the second opening 312, and the weight member 33 is fixed by the holding part 313 in the second opening 312. The user can replace the weight member 33 with different weight according to the user's preference. In order to make different the weight member 33 to accommodate in the second opening 312, one kind of the weight member 33 have a hollow area in a central thereof to reduce weight, which has the same size.

Referring to FIG. 10A, FIG. 10B to FIG. 12A, FIG. 12B, a schematic view of the motor module 30 and the support 40 according to the first embodiment is shown, wherein the motor module 30 is not fixed to the support 40. The motor module 30 is placed on the support 40, but the user has not applied force on the driving part 116 yet. Therefore, the matching part 314 of the motor module 30 is only aligned to the access hole of the alignment part 43 of the support 40. Specifically, the first matching portion 3141 aligns to, but not engages with the first alignment part 431. The second matching portion 3142 aligns to, but does not engages with the second alignment part 432. The third matching portion 3143 aligns to, but does not engages with the third alignment part 433. Besides, the blocking part 315 of the motor module 30 only touches the free end of the engaging part 44.

Referring to FIG. 13A, FIG. 13B to FIG. 15A, FIG. 15B, a schematic view of the motor module 30 and the support 40 according to the first embodiment is shown, wherein the motor module 30 is fixed to the support 40. When the motor module 30 is placed on the support 40, the user applies a Y direction force on the driving part 116 which makes the motor module 30 rotates along the central axis X and then the matching part 314 rotates into the access hole of the alignment part 43 of the support 40. Specifically, the first matching portion 3141 is rotated to enter the first alignment part 431, the second matching portion 3142 is rotated to enter the second alignment part 432, the third matching portion 3143 is rotated to enter the third alignment part 433, besides, the blocking part 315 of the motor module 30 slides along the free end of the engaging part 44 and be fastened.

Figure 14A:
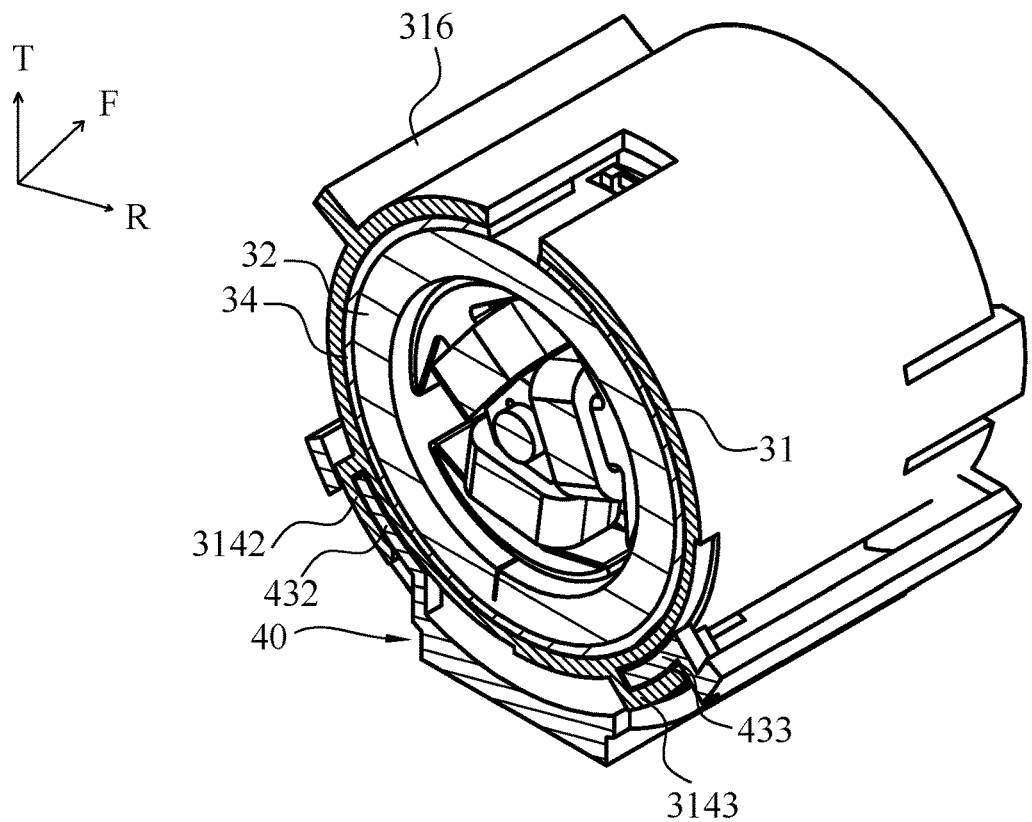
FIG. 14A is a cross-sectional view of FIG. 13A along line C-C.
Figure 14B:
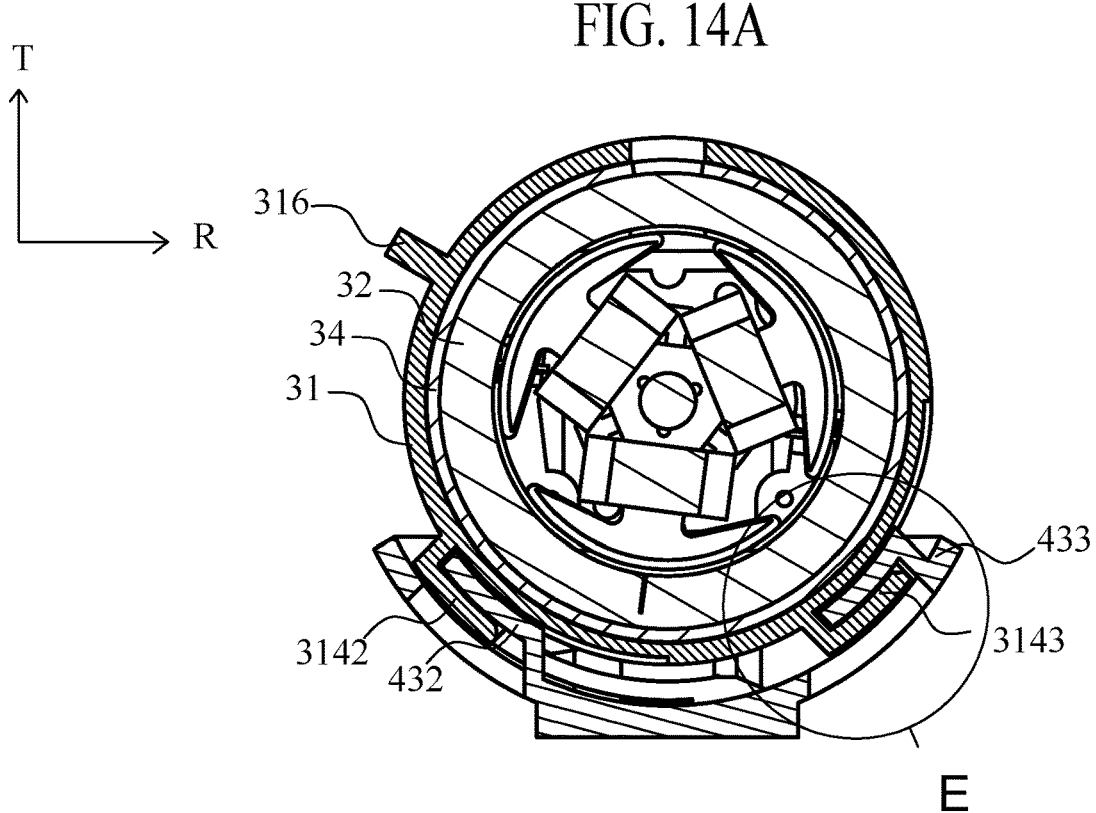
FIG. 14B is a cross-sectional view of FIG. 13B along line C-C.
Figure 16A:
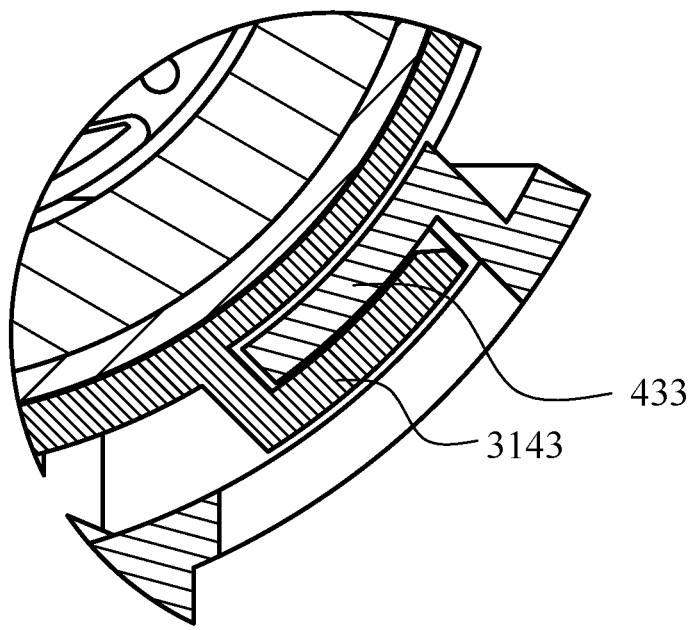
FIG. 16A is an enlarged view of a portion E of FIG. 14B.

Referring to FIG. 16A, an enlarged view of a portion E of FIG. 14B is shown. Although only the third matching portion 3143 and the third alignment part 433 are shown in the figure, however, in the present embodiment, those characteristics of two structure are equal to the characteristics of the matching part 314 and the alignment part 43. Specifically, a size of the access slot of the third matching portion 3143 is equal to a size of the access hole of the third alignment part 433, and a length of a bending portion of the third matching portion 3143 is equal to a length of a bending portion of the third alignment part 433, moreover, an opening direction of the access slot of the third matching portion 3143 is opposite to an opening direction of the access hole of the third alignment part 433.

Figure 15A:
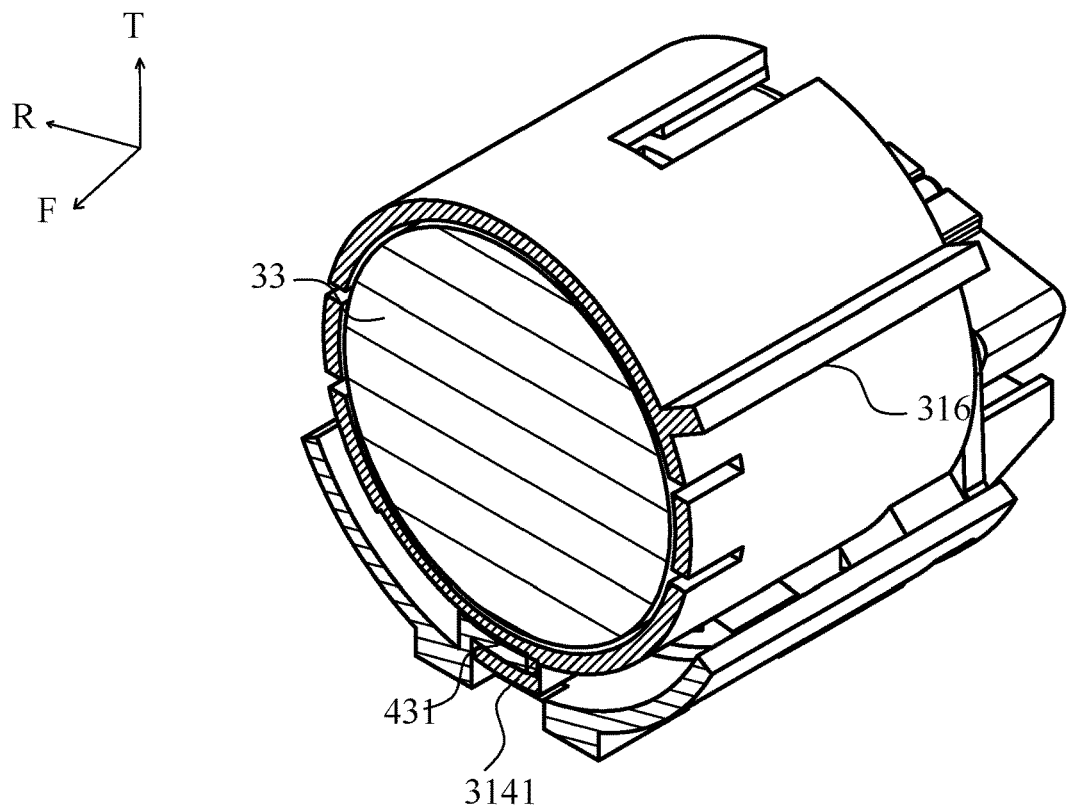
FIG. 15A is a cross-sectional view of FIG. 13A along line D-D.
Figure 15B:
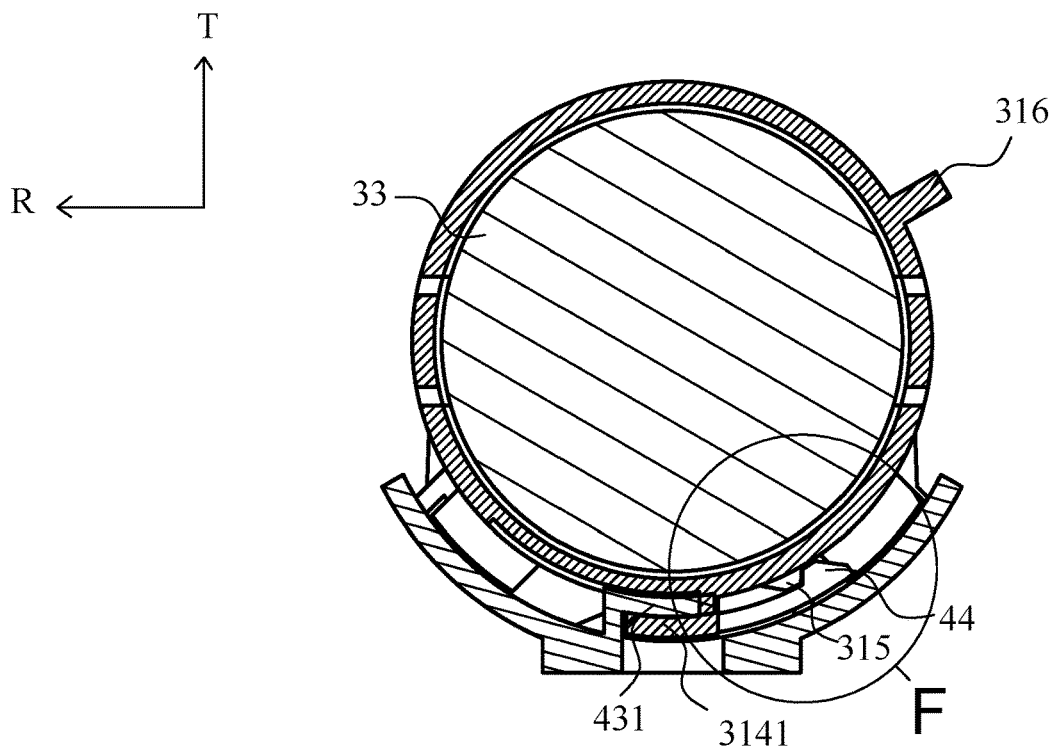
FIG. 15B is a cross-sectional view of FIG. 13B along line D-D.
Figure 16B:
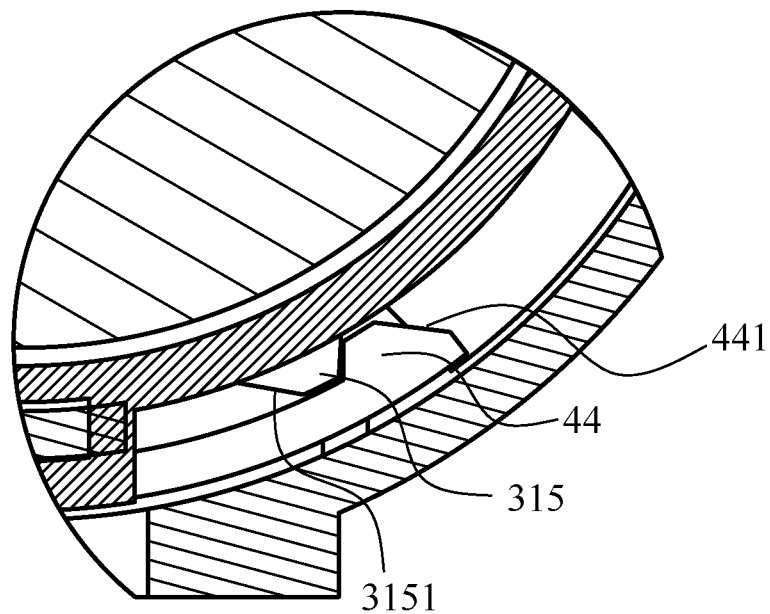
FIG. 16B is an enlarged view of a portion F of FIG. 15B.

Referring to FIG. 16B, an enlarged view of a portion F of FIG. 15B is shown. The blocking part 315 has an inclined surface 3151, when the user applies force to rotate the motor module 30, the inclined surface 3151 pushes against a touching plane 441 of the engaging part 44 toward the hollow area 401 of the support 40 and the engaging part 44 is urged to move into the hollow area 401, and then when the blocking part 315 is rotated to inside the engaging part 44, the engaging part 44 returns elastically from the hollow area 401.

Figure 17:
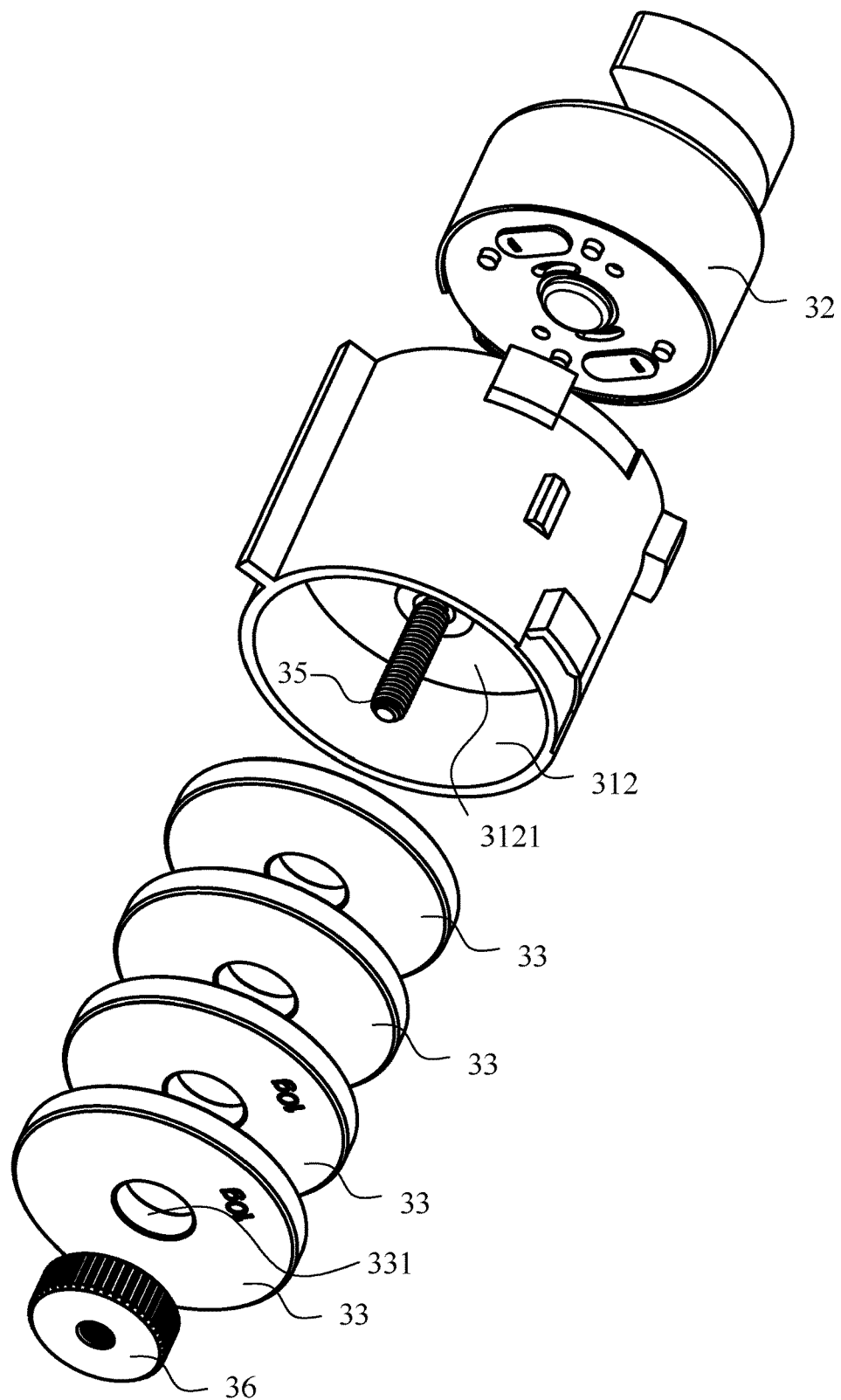
FIG. 17 is an exploded view of the motor module according to a second embodiment.
Figure 18A:
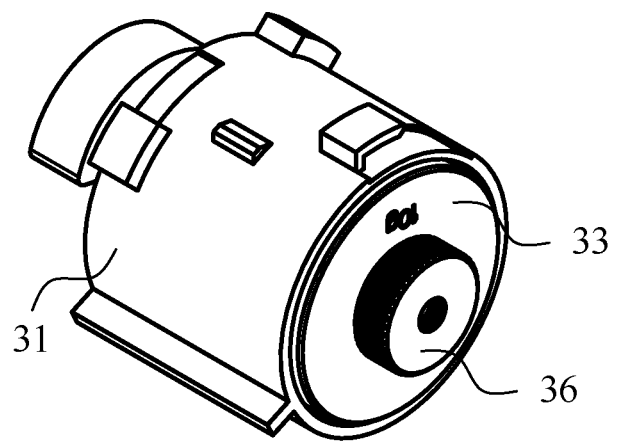
FIG. 18A is a schematic view of a vibration motor according to the second embodiment.
Figure 18B:
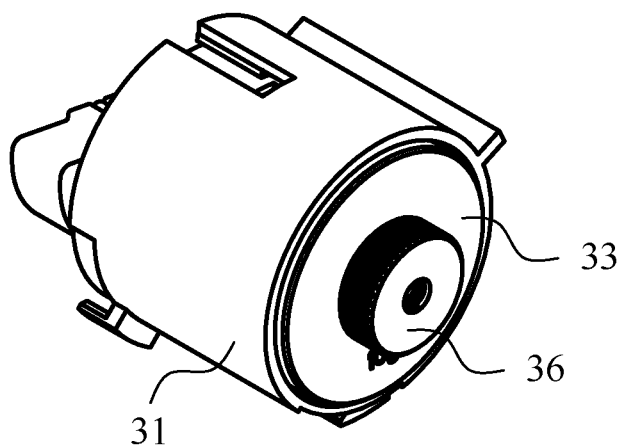
FIG. 18B is a schematic view of the vibration motor according to the second embodiment.

Referring to FIG. 17, FIG. 18A and FIG. 18B, the motor module 30 in accordance with a second embodiment of the present invention is shown. The second embodiment provides another way to fix the weight member 33. A central of the second-opening bottom surface 3121 of the housing 31 extends a stud 35. The weight member 33 includes a through hole 33 in a central thereof for sleeving the stud 35. The user can choose the weight member 33 to stack the weight member 33 in the stud 35 and then fasten the weight member 33 by a nut 36.

As described above, the present invention provides the motor module 30 for the user to replace the vibration motor 32 and the weight member 33. Moreover, the motor module 30 is able to be disassembled easily from the support 40 by using the matching part 314 and the blocking part 315 in the housing 31.

What is claimed is:
1. A controller with a motor module, comprising:
a body having a support disposed inside the body, the support including an engaging part;
a motor module with a central axis, the motor module including a blocking part and the engaging part and the blocking part being able to engage each other by rotating along the central axis of the motor module;

an alignment part disposed on the support and a matching part disposed on a housing;

wherein the alignment part is a groove structure, the matching part is a hook structure, the engaging part is a fastener structure, the blocking part is a wedge structure, and the alignment part and the matching part are able to engage each other by rotating along the central axis of the motor module.

2. The controller with the motor module as claimed in claim 1, wherein a first side of the housing of the motor module comprises a first opening.

3. The controller with the motor module as claimed in claim 2, further comprising:

a vibration motor having a stator core extended from a first side of the vibration motor, and at least one weight member, wherein the vibration motor is accommodated inside the housing and the stator core is exposed outside the first opening, and the weight member is accommodated inside the housing on a second side of the vibration motor.

4. The controller with the motor module as claimed in claim 3, wherein a second opening is arranged at a second side of the housing, the vibration motor is accommodated inside the first opening of the housing, and the weight member is accommodated inside the second opening of the housing.

5. The controller with the motor module as claimed in claim 4, further comprising:

a bearing part arranged inside the housing, a stud extended outwardly toward the second opening from the bearing part, and a nut fastened to the stud, wherein the weight member has a through hole, the stud passes through the through hole of the weight member and the weight member is sandwiched between the nut and the bearing part.

6. A controller with a motor module, comprising:
a body;
a support disposed inside the body, the support comprising:
an alignment part disposed on the support;
an engaging part disposed on the support;
a motor module having a central axis and is capable of dismounting from the support, the motor module comprising:
a housing;
a matching part disposed on the housing; and
a blocking part disposed on the housing,
wherein the alignment part is a groove structure, the matching part is a hook structure, the engaging part is a fastener structure, the blocking part is a wedge structure and when the motor module is applied a force to make the motor module rotate along the central axis thereof, the matching part engages with the alignment part, and the blocking part engages with the engaging part.

7. The controller with the motor module as claimed in claim 6, wherein the housing of the motor module comprises a driving part.

8. The controller with the motor module as claimed in claim 6, wherein a first side of the housing of the motor module comprises a first opening.

9. The controller with the motor module as claimed in claim 8, further comprising:

a vibration motor having a stator core extended from a first side of the vibration motor and at least one weight member, wherein the vibration motor is accommodated inside the housing and the stator core is exposed outside the first opening, and the weight member is accommodated inside the housing on a second side of the vibration motor.

10. The controller with the motor module as claimed in claim 9, wherein the vibration motor includes a connecting port and the housing includes a notch, and a position of the connecting port is corresponding to a position of the notch.

11. The controller with the motor module as claimed in claim 8, wherein a second opening is arranged at a second side of the housing, the vibration motor is accommodated inside the first opening of the housing, and the weight member is accommodated inside the second opening of the housing.

12. The controller with the motor module as claimed in claim 11, wherein at least one holding part is positioned near the second opening.

13. The controller with the motor module as claimed in claim 11, further comprising:

a bearing part arranged inside the housing, a stud extended outwardly toward the second opening from the bearing part, and a nut being fastened to the stud, wherein the weight member has a through hole, the stud passes through the through hole of the weight member and the weight member is sandwiched between the nut and the bearing part.

14. A motor module for using in a controller, comprising:
a housing;
a first opening formed on one end of the housing;
a vibration motor having a stator core extending from a first side of the vibration motor, the vibration motor accommodated in the housing and the stator core exposed outside the first opening;
at least one weight member accommodated in the housing and located at a second side of the vibration motor;
a support for engaging with the motor module;
at least one alignment part disposed on the support; and
an engaging part disposed on the support;
wherein when the motor module is applied a force to make the motor module rotate along a central axis thereof, the matching part engages with the alignment part, and the blocking part engages with the engaging part.

15. The motor module as claimed in claim 14, wherein a second opening is arranged at a second side of the housing, the vibration motor is accommodated inside the first opening of the housing, and the weight member is accommodated inside the second opening of the housing.

16. The motor module as claimed in claim 14, wherein at least one matching part is disposed on the housing and at least one blocking part is disposed on the housing.

* * * * *